United States Patent [19]
Burdette

[11] Patent Number: 5,143,176
[45] Date of Patent: Sep. 1, 1992

[54] CLIMBING TREE STAND

[76] Inventor: Bryan A. Burdette, Rte. 2, Box 23970, Deer Trail Rd., Benton, La. 71006

[21] Appl. No.: 577,466

[22] Filed: Oct. 15, 1990

[51] Int. Cl.⁵ ............................................ A45C 15/00
[52] U.S. Cl. .................................. 182/187; 182/133
[58] Field of Search ............... 182/135, 136, 134, 187, 182/188; 108/152

[56] References Cited

U.S. PATENT DOCUMENTS

| | | | |
|---|---|---|---|
| 3,568,797 | 3/1971 | Hardy | 182/187 X |
| 4,337,844 | 7/1982 | Hice, Sr. | 182/187 |
| 4,474,265 | 10/1984 | Shinkle | 182/187 |
| 4,475,627 | 10/1984 | Eastridge | 108/152 X |
| 4,589,522 | 5/1986 | Shelton | 108/152 X |
| 4,595,079 | 6/1986 | Shope | 182/187 |
| 4,723,630 | 2/1988 | Wolford | 182/187 X |
| 4,834,217 | 5/1989 | Manes | 182/187 |
| 4,989,766 | 2/1991 | Lewallyn et al. | 182/187 X |

*Primary Examiner*—Karen J. Chotkowski

[57] ABSTRACT

A climbing apparatus which provides a mechanical means of ascending or descending any generally vertical member such as a tree to support a person when in a climbing, seated or standing position by means of two locking points of contact against the vertical member. The climbing apparatus is collapsible and compactable apparatus and may be constructed of any material that would allow sufficient physical strength to support an average person and be sufficiently light weight for a person to carry by means of backpacking.

7 Claims, 4 Drawing Sheets

CLIMBING TREE STAND

FIELD OF THE INVENTION

My invention relates to a climbing apparatus, usually but not exclusively used by hunters, to climb trees for the purpose of hunting deer.

DESCRIPTION OF PRIOR ART

Climbing tree stands used in this environment are numerous and as individual as their creators. Many different approaches have evolved in the past years to solve this same problem. How to ascent a tree for the purpose of hunting deer from a stand above the ground. Therefore, they are built of all types of materials such as wood, metals, and plastics. Arrangement of design and materials are such as to afford its user a way of climbing a tree, then being stationed there for a length of time. Some climbing tree stands are more effective at accomplishing this than are others, as would be expected. The trend today leans toward them being more comfortable, safe, and lighter than previous models. Many stands are for a specific type of hunter, (gun hunters and bow hunters) and more than one stand is usually required for a person who participates in both sports. Thus is my application for patent on my climbing tree stand to solve this problem.

SUMMARY OF THE INVENTION

I propose that my invention is unlike any other in design and it provides yet another solution to the problem of ascending trees. Also, my climbing tree stand will afford its user a safe, comfortable way of hunting in this fashion whether he be a gun or bow hunter. My climbing tree stand provides a comfortable sling seat, made of a flexible fabric, to support a person when seated and a platform to rest his feet or support his full weight when standing. Further, a safety bar is provided to prevent accidental falls from the stand.

DESCRIPTION OF THE PREFERRED EMBODIMENTS

Figure 1:
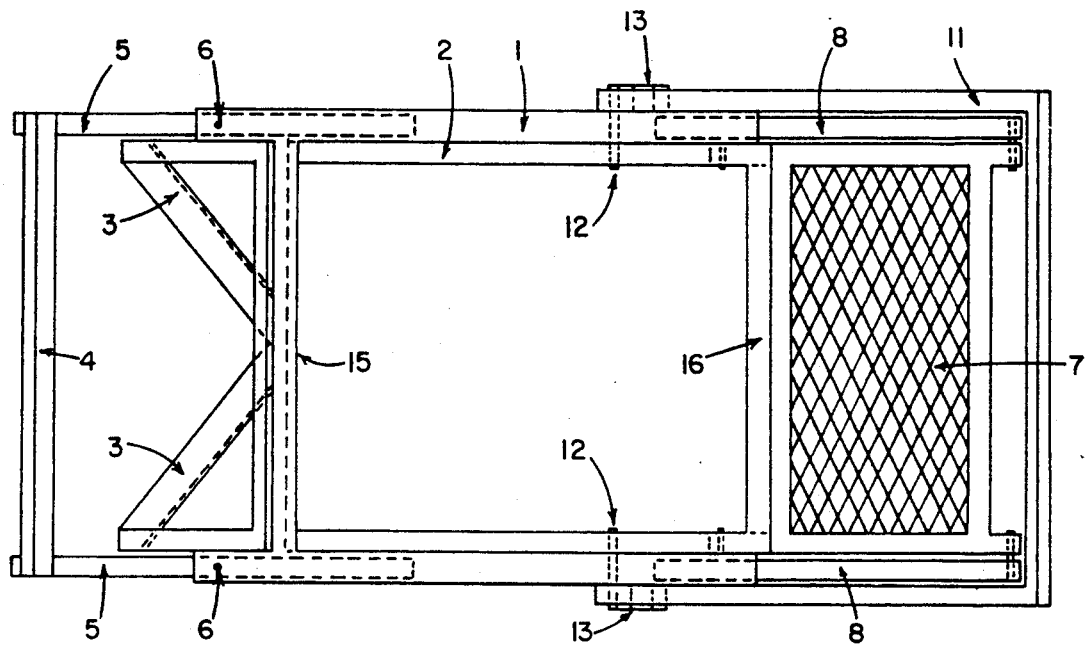
FIG. 1 is a top view of the tree stand in its extended position.
Figure 2:
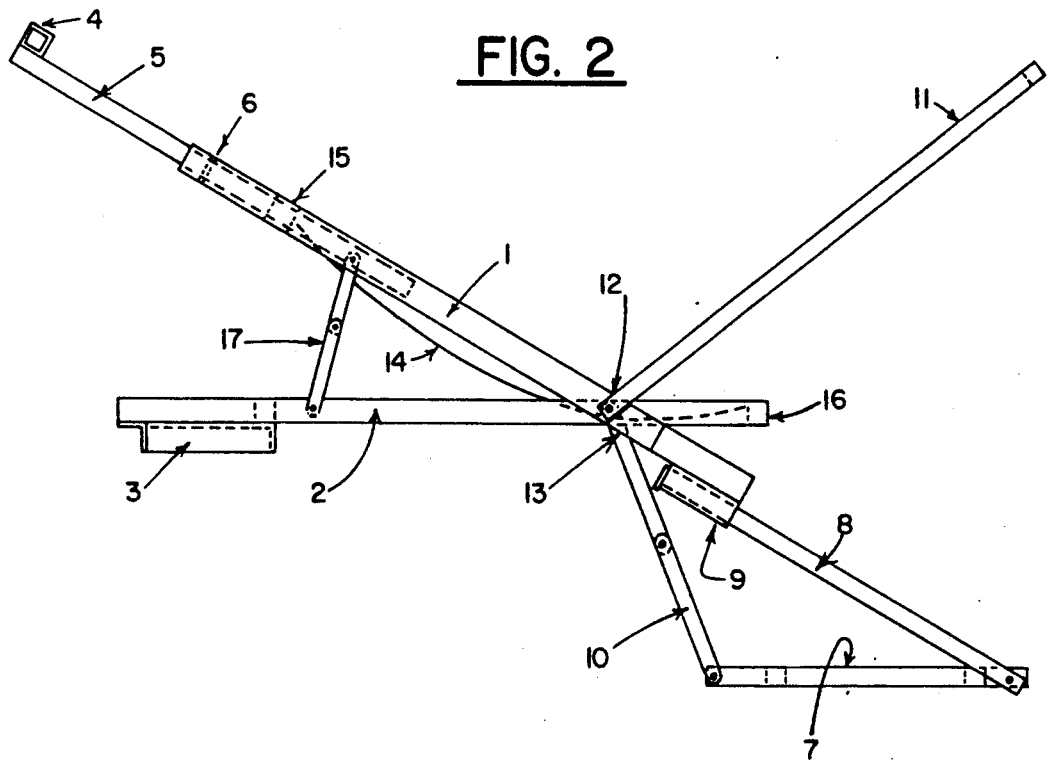
FIG. 2 is a side view of the tree stand.
Figure 3:
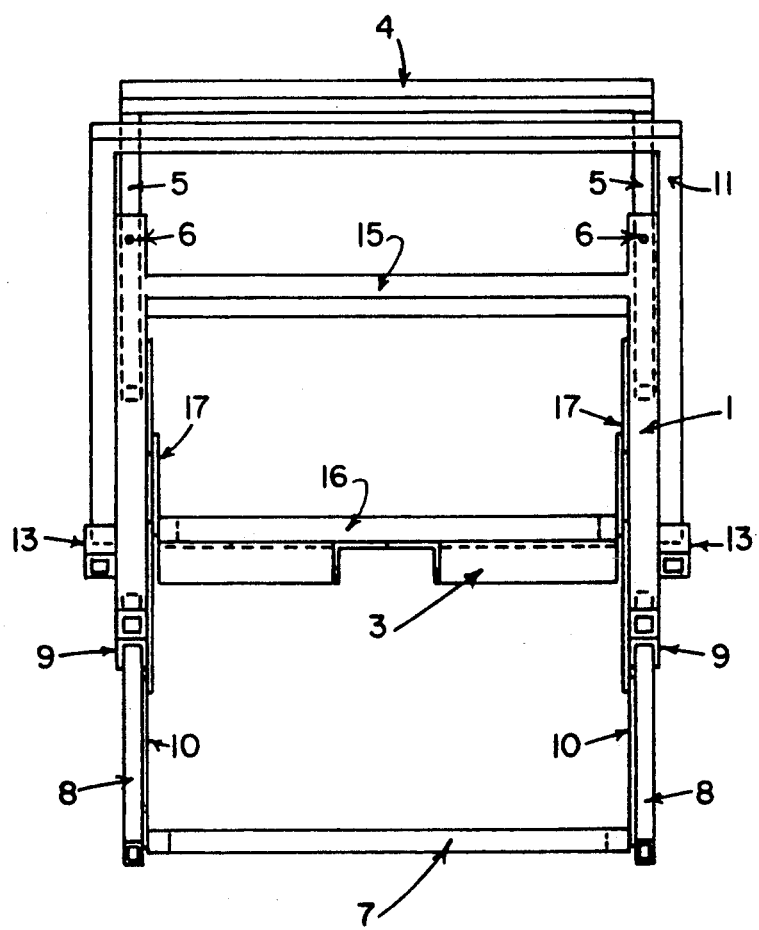
FIG. 3 is front view of the tree stand in the extended position, wherein the fabric of the sling seat is not shown for clarity.
Figure 4:
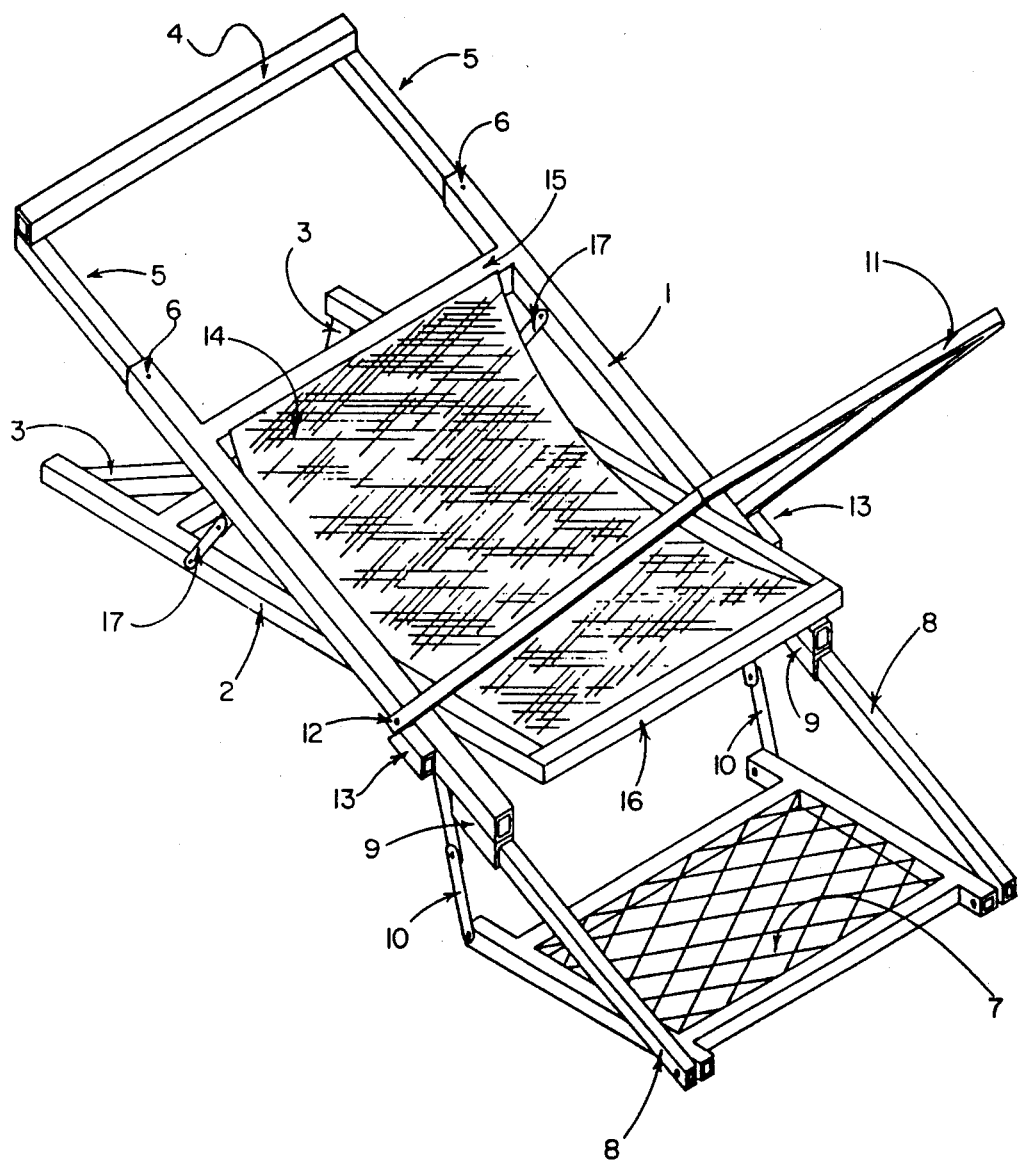
FIG. 4 is a perspective view of the tree stand in the extended position, showing the sling seat in place.
Figure 5:
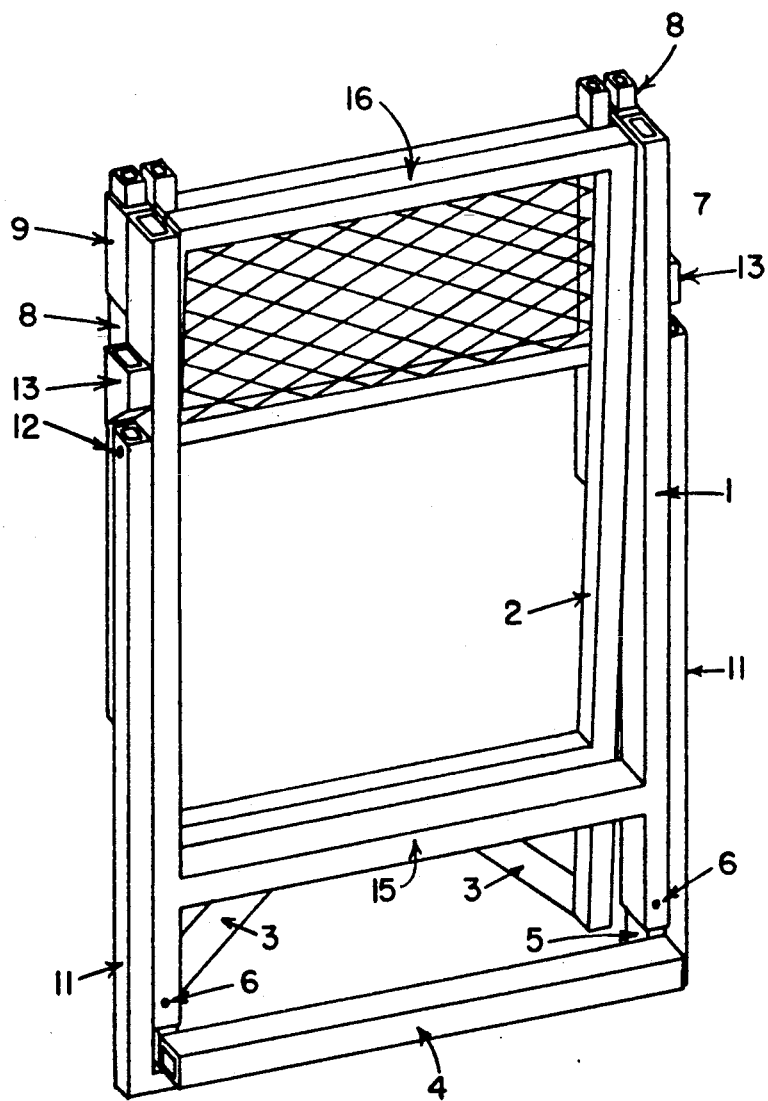
FIG. 5 is a perspective view of the tree stand in collapsed position for backpacking with the sling seat omitted for clarity.

The portable climbing apparatus of this invention is designed for engaging a generally vertical member to support a person above the ground in a seated or standing position. The apparatus includes two generally rectangular frames hereinafter referred to as the main frame 1 and the base frame 2, constructed of generally tubular members and engaging members 3 provided on the base frame 2 to contact and grip the vertical member as angle members fastened to the base frame 2 at the rear. A tubular gripping member 4 provided at the upper portion of the main frame 1 connected perpendicularly to parallel tubular, telescoping side members 5 which slide through the main frame 1 to grip the vertical member for the purpose of ascending, descending, or being temporarily positioned at any height above the ground. The gripping member 4 is fully adjustable by telescoping of the tubular side members 5 through the main frame and locked by means of pins, rods, or bolts 6. A footrest platform 7 is the provided at lower portion of the main frame 1 to receive a person's feet and the platform 7 includes slidable members 8, connected through tubular brackets 9 attached at the lower portion of the main frame 1 and having folding members 10 provided at the rear of the footrest platform 7 to support the footrest platform 7 and thus support person in the standing position. A safety bar 11 is attached to the main frame 1 at a pivot point 12 to provide a railing to prevent accidental falls when a person is standing on the footrest platform 7. The safety bar 11 is locked in the open position by means of gravity as it rests, on or against, brace members 13 at each side of and attached to the lower portion of the main frame 1 at or near the pivot point 12 a sling seat 14 is also provided to support a person when in a seated or climbing position which sling seat is made of a flexible fabric material and is connected at the upper portion of the main frame 1 at a first cross member 15 connected perpendicularly to the side members of the main frame 1 and to the lower portion of the base frame 2 at a second cross member connected perpendicularly to the side members of the base frame 3. The pins, rods, bolts, or alternative hinge members 12 are used to connect the main frame 1, the base frame, to the safety bar 11, and the footrest platform 7 along with first folding support members 10 to facilitate collapsibility of the entire climbing apparatus for portability. Second folding support members 17 are connected at the upper portion of the side members of the main frame 1 and at the rear portion of the side members of the base frame 2 to support and suspend the base frame 2 from the main frame when the climbing apparatus is attached to the generally vertical member.

I claim:

1. A portable climbing apparatus for ascending and descending a tree and designed to support a person in seating or standing position, comprising a generally rectangular main frame and a generally rectangular base frame pivotally carried by said main frame; engaging members provided on said base from for contacting and gripping the front of the tree; gripping means provided on one end of said main frame for contacting and gripping the back of the tree; and a support means comprising a sling seat mounted on said main frame and said base frame for supporting the person in said portable climbing apparatus.

2. The portable climbing apparatus of claim 1 wherein said gripping means further comprises telescoping side members engaging said main frame in telescoping relationship and a tubular gripping member connecting the ends of said telescoping side members for engaging the tree above said engaging members in adjustable relationship.

3. The portable climbing apparatus of claim 1 wherein said engaging members are mounted on one end of said base frame in angular, coplanar relationship for seating against the tree.

4. The portable climbing apparatus of claim 1 wherein said gripping means further comprises telescoping side members engaging said main frame in telescoping relationship and a tubular gripping member connecting the ends of said telescoping side members for engaging the tree above said gripping means in adjustable relationship and wherein said engaging members are mounted on one end of said base frame in angular, coplanar relationship for seating against the tree.

5. The portable climbing apparatus of claim 1 wherein said support means further comprises a footrest mounted on the opposite end of said main frame for supporting the person.

6. The portable climbing apparatus of claim 5 wherein said gripping means further comprises telescoping side members engaging said one end of said main frame in telescoping relationship and a tubular gripping member connecting the ends of said telescoping side members for engaging the tree above said engaging members in adjustable relationship.

7. The portable climbing apparatus of claim 6 wherein said engaging members are mounted on one end of said base frame in angular, coplanar relationship for seating against the tree.

* * * * *